United States Patent
Dhanapal

(10) Patent No.: US 8,824,328 B2
(45) Date of Patent: Sep. 2, 2014

(54) SYSTEMS AND METHODS FOR OPTIMIZING THE PERFORMANCE OF AN APPLICATION COMMUNICATING OVER A NETWORK

(75) Inventor: Karthikeyan Balaji Dhanapal, Chennai (IN)

(73) Assignee: Infosys Limited, Bangalore (IN)

( * ) Notice: Subject to any disclaimer, the term of this patent is extended or adjusted under 35 U.S.C. 154(b) by 88 days.

(21) Appl. No.: 13/532,151

(22) Filed: Jun. 25, 2012

(65) Prior Publication Data

US 2013/0223243 A1  Aug. 29, 2013

(30) Foreign Application Priority Data

Feb. 29, 2012  (IN) .............................. 760/CHE/2012

(51) Int. Cl.
*H04W 24/00* (2009.01)
(52) U.S. Cl.
USPC ........... 370/252; 455/423; 455/424; 455/425; 455/522
(58) Field of Classification Search
USPC .................... 370/252, 238; 455/423–425, 522
See application file for complete search history.

(56) References Cited

U.S. PATENT DOCUMENTS

| | | | |
|---|---|---|---|
| 7,139,281 B1 * | 11/2006 | Bodin ............................ | 370/412 |
| 7,231,330 B2 | 6/2007 | Hernandez-Mondragon et al. | |
| 7,283,483 B2 * | 10/2007 | Asawa et al. ................. | 370/252 |
| 7,408,879 B2 * | 8/2008 | Jo et al. .......................... | 370/235 |
| 7,698,121 B2 | 4/2010 | Steenkiste et al. | |
| 2002/0015387 A1 * | 2/2002 | Houh ............................. | 370/250 |
| 2004/0192295 A1 * | 9/2004 | Tsao et al. .................. | 455/432.1 |
| 2006/0067351 A1 * | 3/2006 | Liu et al. ....................... | 370/429 |
| 2006/0072628 A1 * | 4/2006 | Liu et al. ....................... | 370/516 |
| 2009/0209250 A1 * | 8/2009 | Huq .............................. | 455/425 |
| 2009/0259445 A1 * | 10/2009 | Bedrosian ......................... | 703/2 |
| 2010/0296403 A1 | 11/2010 | Qiu et al. | |
| 2010/0309934 A1 * | 12/2010 | Umayabashi et al. ........ | 370/509 |
| 2012/0236740 A1 * | 9/2012 | Dhanapal ...................... | 370/252 |

OTHER PUBLICATIONS

Calegari et al., "CTG: A Connectivity Trace Generator for Testing the Performance of Opportunistic Mobile Systems," ESEC/FSE'07, Cavtat near Dubrovnik, Croatia, 415-424 (Sep. 3-7, 2007).

* cited by examiner

*Primary Examiner* — Melanie Jagannathan
*Assistant Examiner* — Berhanu Belete
(74) *Attorney, Agent, or Firm* — LeClairRyan, a Professional Corporation

(57) ABSTRACT

Systems and methods for optimizing the performance of an application, as described, may include determining an arrival time of a packet at a network emulator node by the network emulator node, wherein the packet is transmitted from a node to the network emulator node over the network, establishing a packet ordering queue at the network emulator node, applying a maximum delay time by the network emulator node, applying a minimum delay time by the network emulator node, and computing a packet departure time for the packet from the network emulator node. An exemplary embodiment may additionally include the determination of a bandwidth delay time, where the applicable network bandwidth is imposed by the network emulator node.

19 Claims, 5 Drawing Sheets

SYSTEMS AND METHODS FOR OPTIMIZING THE PERFORMANCE OF AN APPLICATION COMMUNICATING OVER A NETWORK

CROSS-REFERENCE TO RELATED APPLICATIONS

This application claims the benefit of Indian Patent Application Filing No. 760/CHE/2012, filed Feb. 29, 2012, which is hereby incorporated by reference in its entirety.

FIELD

The invention relates generally to the optimization of the performance of an application communicating over a network. In particular, the invention relates to optimizing the performance of an application by measuring application performance in emulated network conditions, and adjusting application characteristics accordingly.

BACKGROUND

Network emulation, whereby the conditions of a hypothetical network are simulated, is often integrated in the performance modeling of an application where reception, or delivery, of data by the application over a network is important. Present techniques for network emulation may include the insertion of a dedicated network emulator, in hardware or software, on a local area network (LAN) or as a node on a wireless local area network (WLAN).

Present techniques in the emulation of network condition include scenarios wherein network emulators can be deployed to model several properties of a target network, including network latency, jitter, and estimate packet loss over the network, or, notably, model aspects of bandwidth parameters associated with the target network, or delay variation in isolation. However, existing techniques do not include scenarios wherein some or all of these parameters can be combined, i.e., existing techniques may be able to emulate bandwidth or delay parameters, or the packet ordering associated with a target network, but not all of these. In this context, it is clear that there exists a need in the art for the provision of methods and systems for optimizing the performance of an application communicating over a network, wherein the method used is able to accurately model multiple conditions associated with a target network simultaneously.

SUMMARY

The present invention addresses the foregoing need by providing systems and method for optimizing the performance of an application communicating over a network.

In accordance with the invention, in a first embodiment, a method for optimizing the performance of an application communicating over a network is described, the method consisting of determining an arrival time of a packet at a network emulator node by the network emulator node, wherein the packet is transmitted from a node to the network emulator node over the network, and wherein the network emulator node comprises a processor and a processor readable memory, establishing a packet ordering queue at the network emulator node, wherein the position of the packet in the packet ordering queue corresponds to a time determinate order of reception of the packet by the network emulator node, applying a maximum delay time by the network emulator node, applying a minimum delay time by the network emulator node, and computing a packet departure time for the packet from the network emulator node, wherein the packet departure time incorporates a delay determined on the basis of the packet arrival time, the maximum delay time, the minimum delay time, and the position of the packet in the packet ordering queue.

In accordance with the invention, in a second embodiment, a system for optimizing the performance of an application in a network is described, the system comprising a network emulator node operable to connect to a network, the network emulator node comprising a processor and a processor readable memory and wherein the network emulator node is adapted to determine an arrival time of a packet at the network emulator node, establish a packet ordering queue, wherein the position of the packet in the packet ordering queue corresponds to a time determinate order of reception of the packet by the network emulator node, apply a maximum delay time by the network emulator node, apply a minimum delay time by the network emulator node, and computing a packet departure time for the packet from the network emulator node, wherein the packet departure time incorporates a delay determined on the basis of the packet arrival time, the maximum delay time, the minimum delay time, and the position of the packet in the packet ordering queue.

BRIEF DESCRIPTION OF THE DRAWINGS

These and other features, aspects, and advantages of the present invention will be better understood when the following detailed description is read with reference to the accompanying drawings in which like characters represent like parts throughout the drawings, wherein.

While systems and methods are described herein by way of example and embodiments, those skilled in the art recognize that systems and methods for optimizing the performance of an application communicating over a network are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

The following description is the full and informative description of the best method and system presently contemplated for carrying out the present invention which is known to the inventors at the time of filing the patent application.

Exemplary Computing Environment

Figure 1:
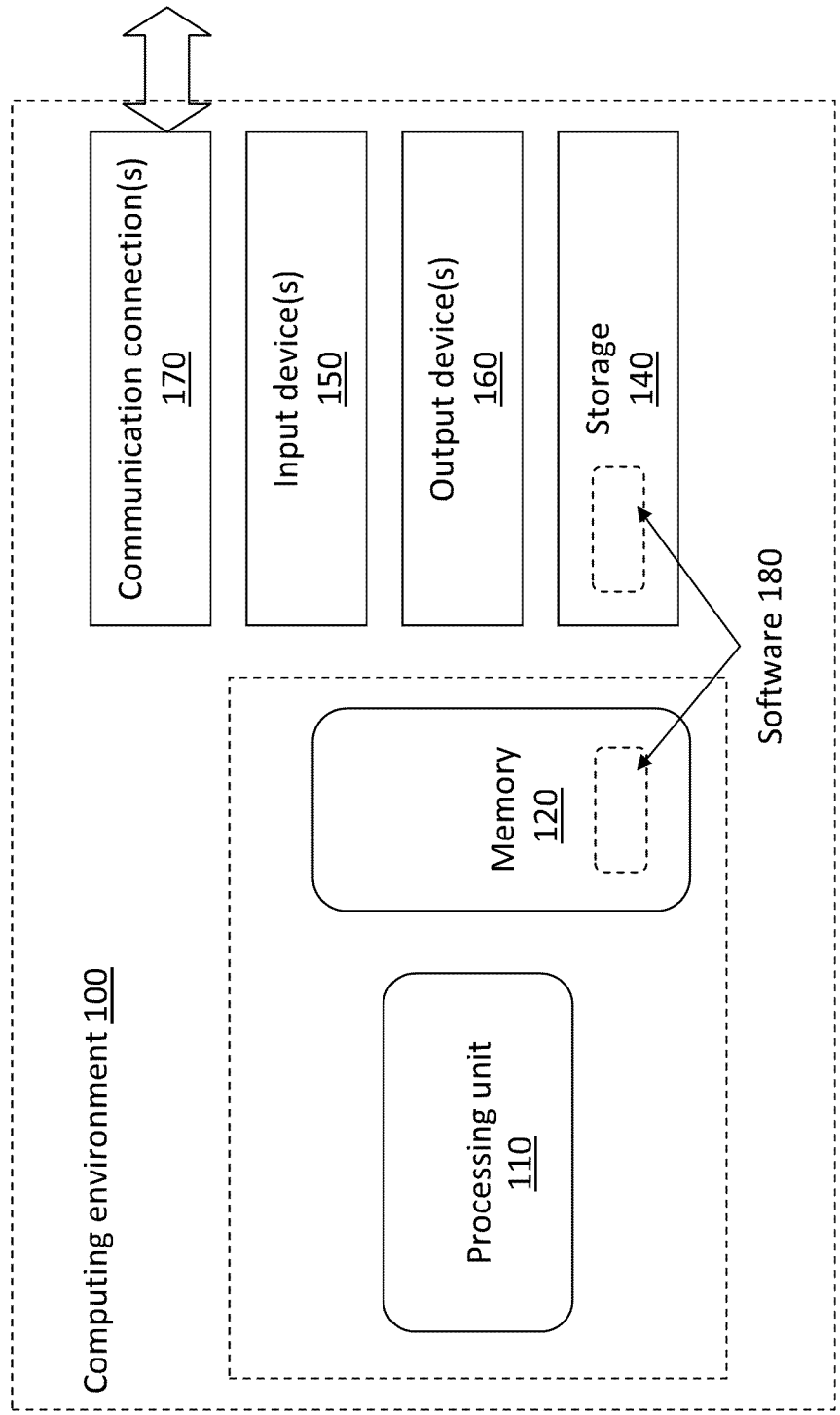
FIG. 1 is an illustration of an exemplary computing environment for the execution of a method for optimizing the performance of an application communicating over a network.

One or more of the above-described techniques may be implemented in or involve one or more computer systems. FIG. 1 illustrates a generalized example of a computing environment 100. The computing environment 100 is not intended to suggest any limitation as to scope of use or functionality of described embodiments.

With reference to FIG. 1, the computing environment 100 includes at least one processing unit 110 and memory 120. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory, etc.), or some combination of the two. In some embodiments, the memory 120 stores software 180 implementing described techniques.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 may be removable or non-removable, and includes magnetic disks, magnetic tapes or cassettes, CD-ROMs, CD-RWs, DVDs, or any other medium which may be used to store information and which may be accessed within the computing environment 100. In some embodiments, the storage 140 stores instructions for the software 180.

The input device(s) 150 may be a touch input device such as a keyboard, mouse, pen, trackball, touch screen, or game controller, a voice input device, a scanning device, a digital camera, or another device that provides input to the computing environment 100. The output device(s) 160 may be a display, printer, speaker, or another device that provides output from the computing environment 100.

The communication connection(s) 170 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 100, computer-readable media include memory 120, storage 140, communication media, and combinations of any of the above.

Exemplary Architecture of a Network Emulator Node

Figure 2:
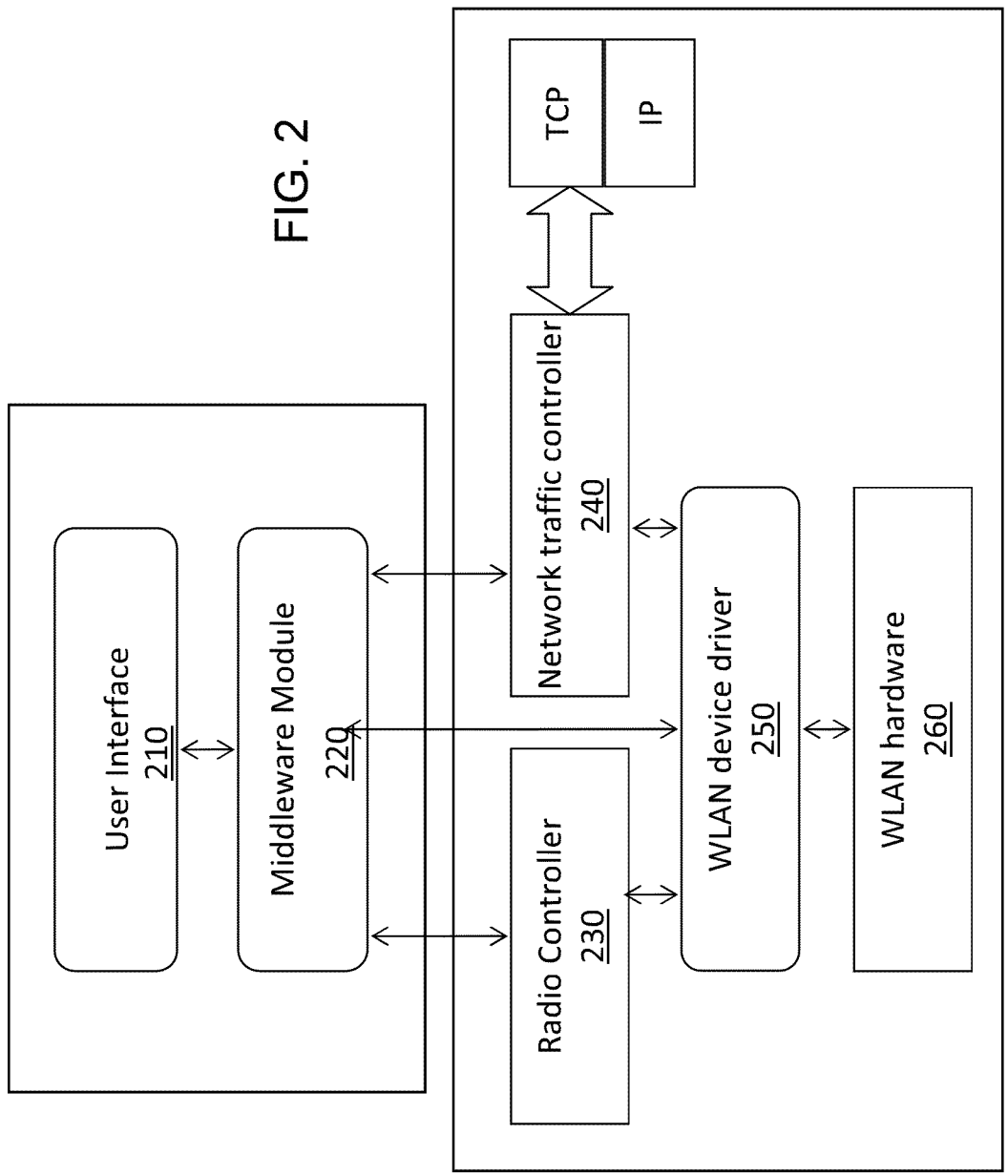
FIG. 2 is an illustration of the architecture of an exemplary network emulation node, in accordance with at least one embodiment of the invention.

As in FIG. 2, and in accordance with some embodiments of the invention, an exemplary network emulator node may consist of a user interface, 210, and a middleware module 220. The user interface module may be a computing device, such as a laptop, or a desktop computer, or a smartphone, or a tablet device. The middleware module 220 may include software configured in accordance with one or more embodiments of the invention. The network emulator node may additionally comprise a radio controller 230, and a network traffic controller 240. The middleware module may be programmed to interface between the radio and network controller and the user interface 210. For example, the network traffic controller may be configured by input received at the user interface 210 by means of the middleware module 230. The network traffic controller 240 may be further configured to manage, prioritize, control or reduce incoming or outgoing network traffic, including, as in an exemplary embodiment, network traffic that utilizes the TCP/IP network protocol. The network emulator node may additionally comprise WLAN hardware 260 and a WLAN device driver 250 configured to drive the WLAN hardware. The device driver 250 may be responsive to the middleware 220.

Exemplary Network Environment

Figure 3:
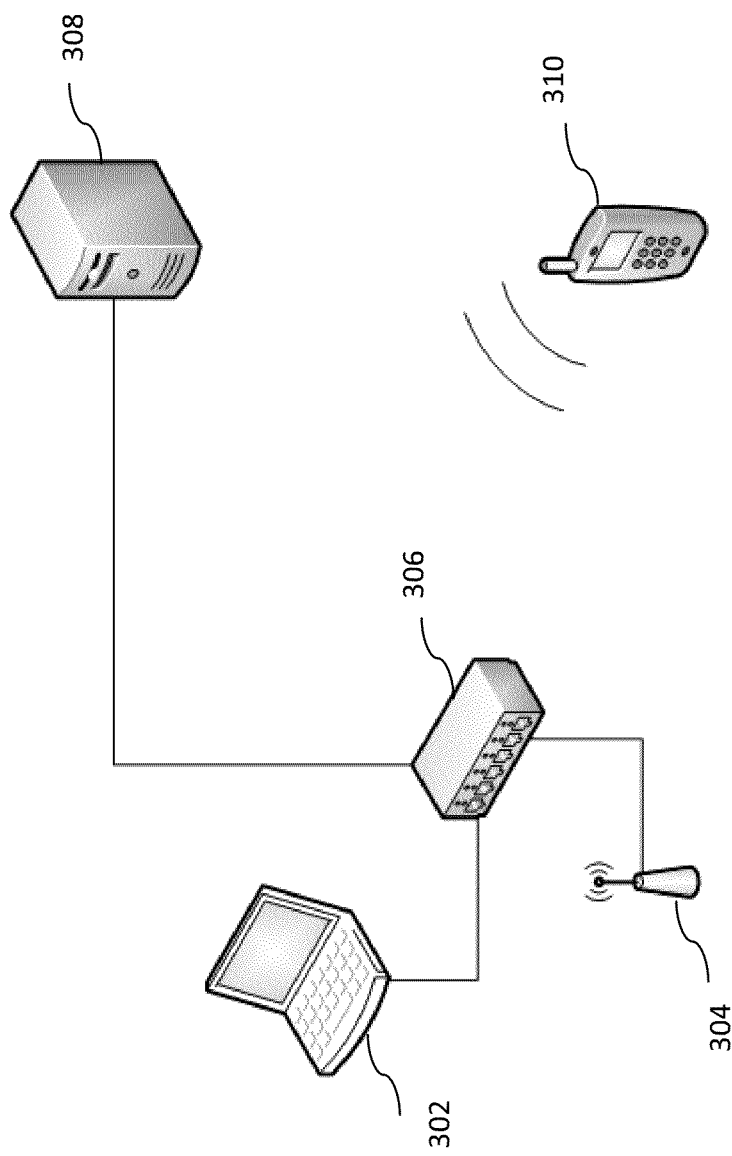
FIG. 3 is an illustration of an exemplary network architecture for the optimization of the performance of an application, in accordance with an embodiment.

An exemplary network environment in accordance with some embodiments of the invention is depicted FIG. 3. A client device running the application whose performance is to be optimized, depicted in 310 as a mobile client, may connect to a server 308 through a network emulator node 306, the network emulator node 306 operably connected to a Wi-Fi access point 304, and a computing device 302 configured to provide a user interface for the network emulator node 306. In some embodiments, Wi-Fi connectivity may be integrated into the network emulator node by means of, for example, wireless LAN cards, thereby allowing the network emulator node 306 to operate as a Wi-Fi access point itself. Additionally, client devices represented by 310 may not, as in some embodiments of the invention, be limited to a mobile device, and may include any computing device comprising a processor and a processor readable memory. While the client 310 may connect to the network emulator node 306 by means of a direct wireless network connection, in some embodiments of the invention, the client device 310 may connect to the network emulator node 306 by means of a wired network connection, or through an intermediary network, such as the internet.

In accordance with an embodiment, the client device 310 may be authenticated by the device driver WLAN layer 250 in the network emulator node. When the client 310 sends a request to the network emulator node 306, the network traffic controller 240 and the radio controller 230 induces network variations, i.e. in order to emulate a target network, in the traffic or signal flowing from the client to the server 308.

Optimizing Application Performance Through Network Emulation

Embodiments of the invention disclose systems and methods that emulate bandwidth, delay and delay variation of a target network without violating a packet ordering property within the network, i.e. a packet received by a network emulator node in a certain order will depart the network emulator node in the same order. Bandwidth, delay and delay variation emulation may be performed by means of a network emulator node based on user set values. Whenever the emulator receives a packet, a network emulator node configured to operate in accordance with embodiments of the invention will calculate a time for which the packet needs to be delayed in the emulator so that network parameter values set by a user is satisfied. Additionally, bandwidth deviation experienced by the application when compared to the user set value during testing may be tracked, and the network emulator node, as a consequence, continuously adjust its bandwidth control mechanism so that the average bandwidth available to the application traffic is closer to the user set value.

Figure 4:
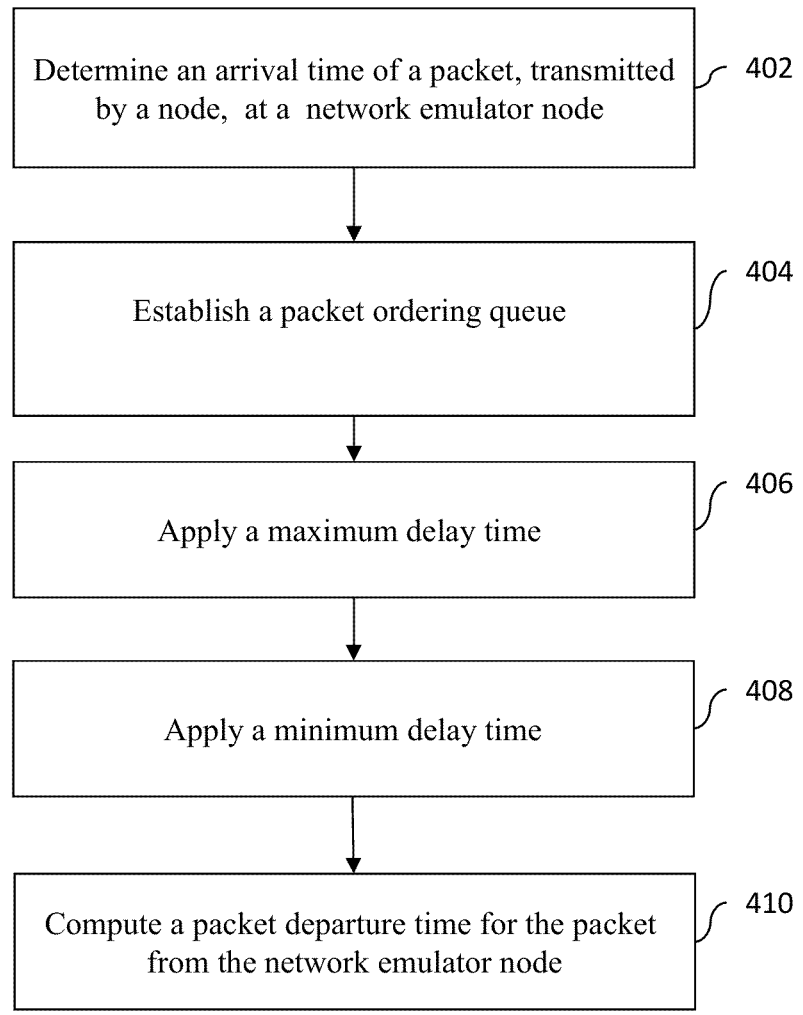
FIG. 4 is an illustrative flow diagram of a method for optimizing the performance of an application over a network, in accordance with an embodiment of the invention.
Figure 5:
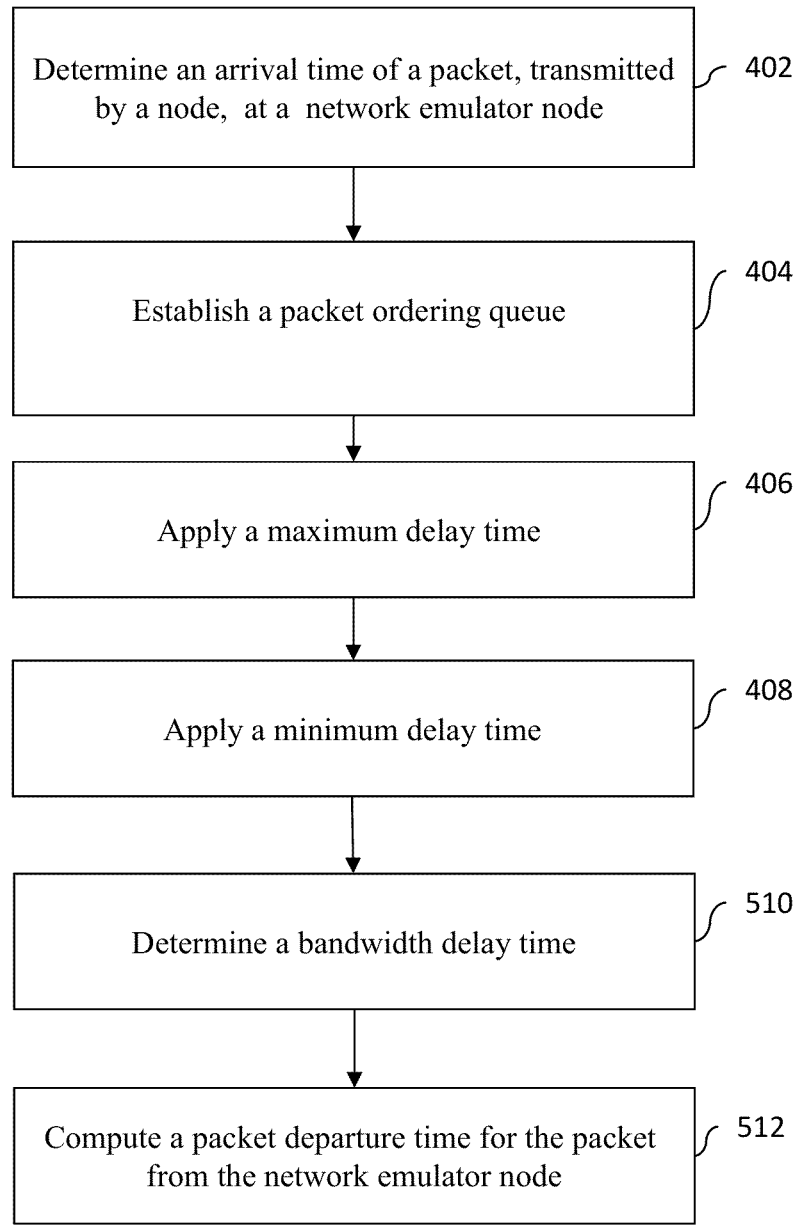
FIG. 5 is an illustrative flow diagram of a method for optimizing the performance of an application over a network that includes the determination of a bandwidth delay time, in accordance with an embodiment.

More specifically, steps involved in the optimization of the performance of an application communicating with a server through an intermediary network emulator node may include, as in 402 of FIG. 4, firstly, determination of an arrival time of a packet transmitted by a node at the network emulator node, by the network emulator node. The node referred to may be, for example, a client device 310 of FIG. 3. Then, a packet ordering queue may be established at the network emulator node, as in 404. Then, a maximum delay time and a minimum delay time may be applied by the network emulator node, as in 406 and 408. The applicable maximum and minimum delay time may be input by a user to the network emulator by means of the user interface to the network emulator node. Then, as in a step 410, a packet departure time for the packet from the network emulator node may be computed. In some embodiments, if the packet delay time exceeds a specified maximum delay time, then that packet can be dropped by the network emulator node. Alternatively, the packet may be allowed to pass through the network. In some embodiments, as in 510 of FIG. 5, a bandwidth delay time may be determined, and the computation of a departure time may include the determined bandwidth delay time, as in 512.

More specifically, in the computation of a departure time for the packet, the following are defined:
 i. '$DT(i)$', where $DT(i)$ is the Departure time of a packet 'i'
 ii. '$AT(i)$', where $AT(i)$ is the Arrival time of packet 'i'
 iii. 'Max D', where Max D is the maximum delay experienced by a packet, which is a user set value.
 iv. 'Min D', where Min D is the minimum delay experienced by a packet, which is a user set value.
 v. 'BW', where BW is a Bandwidth value set by a user.
 vi. '$BT(i)$', bandwidth induced delay, is the size of the packet over the user set bandwidth. That is, $BT(i)$=Size of packet i/BW.
 vii. '$NT(i)$', where '$NT(i)$' is the normal departure time for the packet 'i', is the equal to the sum of the arrival time of the packet 'i', the minimum delay, and the bandwidth time. That is, $NT(i)=AT(i)+\text{Min }D+BT(i)$.

Additionally, for each packet, the available delay time i.e. a specified maximum time for which the packet can be delayed may be defined as:

$$WT(i)=AT(i)+\text{Max }D-DT(i-1), \text{ when } DT(i-1)>AT(i)+\text{Min }D$$

$$=\text{Max }D-\text{Min }D, \text{ when } DT(i-1)<=AT(i)+\text{Min }D$$

A random delay value can be chosen in the time interval $(0,WT(i))$ for delaying packet 'i' if no bandwidth constraint has been imposed by the user at the network emulator node. If, in contrast, a bandwidth constraint has been set, then the delay interval is split into two non-overlapping intervals, 'I1' and 'I2' as follows:

$$I1->(0,BT(i)) \text{ \& } I2->(BT(i), WT(i)), \text{ assuming } BT(i) \text{ is less than } WT(i).$$

Once I1 or I2 is chosen then a random value within that interval is chosen as a delay time for the packet 'i'. The departure time for the packet 'i' may then be calculated as follows:

$$DT(i)=DT(i-1)+\text{Delay time for packet } i, \text{ when } DT(i-1)>AT(i)+\text{Min }D$$

$$=AT(i)+\text{Min }D+\text{Delay time for packet } i, \text{ when } DT(i-1)<=AT(i)+\text{Min }D$$

Packet ordering may be ensured by enforcing $DT(i)>DT(i-1)$. Consequently, bandwidth deviation for the packet 'i' may be calculated as follows:

$$BwDev(i)=DT(i)-(AT(i)+\text{Min }D+BT(i)),$$

where $BwDev(i)$ is the bandwidth deviation for the packet 'i'.

$$CumBwDev(i)=CumBWDev(i-1)+BWDev(i),$$

where $CumBwDev(i)$ is the cumulative bandwidth deviation until the packet 'i'.

The probability of selecting the delay I1, or I2, which affects the departure time $DT(i)$, is dependent upon the value of the cumulative bandwidth deviation associated with the emulated target network to which the packet 'i' may be subject. That is, if $CumBwDev(i)$ is negative, the probability of choosing I1 is $$=1-CumBwDev(i)*(-1)/MaxDev(CumBwDev(i)*(-1)/MaxDev), \text{ where MaxDev is a constant value.}$$

If $CunBwDev(i)$ is positive, the probability of choosing I1 is $$=CumBwDev(i)/MaxDev(1-CumBwDev(i)/MaxDev), \text{ where MaxDev is a constant value.}$$

Performance optimization is contingent upon the ability to emulate realistic network conditions in a controlled environment while satisfying constraints set by the user. Given a traffic pattern and a set of network parameters such as delay, delay variation and bandwidth, embodiments of the invention, as presented, may provide insight into application performance characteristics, allowing a user to identify bottlenecks in application performance over a target network, and optimize application behavior accordingly.

The present description includes the best presently-contemplated method for carrying out the present invention. Various modifications to the embodiment will be readily apparent to those skilled in the art and some features of the present invention may be used without the corresponding use of other features. Accordingly, the present invention is not intended to be limited to the embodiments shown but is to be accorded the widest scope consistent with the principles and features described herein.

As will be appreciated by those ordinary skilled in the art, the aforementioned example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code.

What is claimed is:

1. A method for optimizing the performance of an application communicating over a network, the method comprising:
 determining an arrival time of a packet at a network emulator computing device by the network emulator node, wherein the packet is transmitted from a client device to the network emulator node over the network,
 establishing a packet ordering queue at the network emulator computing device, wherein the position of the packet in the packet ordering queue corresponds to a time determinate order of reception of the packet by the network emulator node;

computing a maximum possible delay value by the network emulator computing device, wherein the maximum possible delay value is defined by $$WT(i)=AT(i)+\text{MaxD}-DT(i-1), \text{ when } DT(i-1)>AT(i)+\text{MinD}$$

$$=\text{MaxD}-\text{MinD}, \text{ when } DT(i-1)<=AT(i)+\text{MinD}$$

where $WT(i)$ is the maximum possible delay value, MaxD is the maximum delay time associated with the packet 'i', MinD is a minimum delay time associated with the packet 'i', DT (i-1) is a departure time of a packet immediatel preceding the packet i in the packet ordering queue, and $AT(i)$ is the arrival time of the packet i at the network emulator node;

applying the computed maximum delay time by the network emulator computing device;

applying a minimum delay time by the network emulator computing device; and computing a packet departure time for the packet from the network emulator computing device, wherein the packet departure time incorporates a delay determined on the basis of the packet arrival time, the maximum delay time, the minimum delay time, and the position of the packet in the packet ordering queue.

2. The method as claimed in claim 1, further comprising determining a bandwidth delay time, wherein the bandwidth delay time is determined by the size of the packet over an effective network bandwidth imposed by the network emulator node.

3. The method as claimed in claim 2, wherein the computing further comprises incorporating the bandwidth delay time associated with the network in the packet departure time.

4. The method as claimed in claim 3, further comprising imposing a bandwidth constraint on the network by a user using the network emulator node.

5. The method as claimed in claim 1, further comprising splitting the delay value, $WT(i)$, into at most two non-overlapping time intervals and selecting a delay value, $DV(i)$, wherein $DV(i)$ is a time period within one of the non-overlapping time intervals and $DV(i)$ is selected at random.

6. The method as claimed in claim 5, wherein the departure time for a packet 'i' is defined as $DT(i)=DT(i-1)+DV(i)$, when $DT(i-1)>AT(i)+\text{MinD}$, where $DT(i)$ is the departure time of packet 'i'.

7. The method as claimed in claim 5, wherein the departure time for a packet 'i' is defined as $DT(i)=AT(i)+\text{MinD}+DV(i)$, when $DT(i-1)<=AT(i)+\text{MinD}$, where $DT(i)$ is the departure time of packet 'i'.

8. The method as claimed in claim 6, further comprising computing a bandwidth deviation for a packet in the packet order queue.

9. The method as claimed in claim 8, wherein the bandwidth deviation for a packet 'i' in the packet order queue is defined as $BwDev(i)=DT(i)-(AT(i)+\text{MinD}+BT(i))$, where $BwDev(i)$ is the bandwidth deviation of the packet 'i' and $BT(i)$ is the bandwidth induced delay.

10. A network emulator computing device comprising
a processor;
a memory, wherein the memory coupled to the processor which are configured to execute programmed instructions stored in the memory comprising:
determining an arrival time of a packet at the network emulator node;
establishing a packet ordering queue, wherein the position of the packet in the packet ordering queue corresponds to a time determinate order of reception of the packet by the network emulator node;

computing a maximum delay value, wherein the maximum possible delay value is defined by $$WT(i)=AT(i)+\text{MaxD}-DT(i-1), \text{ when } DT(i-1)>AT(i)+\text{MinD}$$

$$=\text{MaxD}-\text{MinD}, \text{ when } DT(i-1)<=AT(i)+\text{MinD}$$

where $WT(i)$ is the maximum possible delay value, MaxD is the maximum delay time associated with the packet 'i', MinD is the minimum delay time associated with the packet 'i', $DT(i-1)$ is a departure time of a packet immediately preceding the packet i in the packet ordering queue, and $AT(i)$ is the arrival time of the packet i at the network emulator node;

applying the computed maximum delay time by the network emulator node;

applying a minimum delay time by the network emulator node; and computing a packet departure time for the packet from the network emulator node, wherein the packet departure time incorporates a delay determined on the basis of the packet arrival time, the maximum delay time, the minimum delay time, and the position of the packet in the packet ordering queue.

11. The device as claimed in claim 10, further comprising determining a bandwidth delay time, wherein the bandwidth delay time is determined by the size of the packet over an effective network bandwidth imposed by a network emulator node.

12. The device as claimed in claim 11, wherein computing further comprises incorporating the bandwidth delay time associated with the network in the packet departure time.

13. The device as claimed in claim 12, further comprising imposing a bandwidth constraint on the network using the network emulator node.

14. The device as claimed in claim 10, further comprising splitting the delay value, $WT(i)$ into at most two non-overlapping time intervals and selecting a delay value, $DV(i)$, wherein $DV(i)$ is a time period within one of the non-overlapping time intervals and $DV(i)$ is selected at random.

15. The device as claimed in claim 10, wherein the departure time for a packet 'i' is defined as $DT(i)=DT(i-1)+DV(i)$, when $DT(i-1)>AT(i)+\text{MinD}$, where $DT(i)$ is the departure time of packet 'i'.

16. The device as claimed in claim 10, wherein the departure time for a packet 'i' is defined as $DT(i)=AT(i)+\text{MinD}+DV(i)$, when $DT(i-1)<=AT(i)+\text{MinD}$, where $DT(i)$ is the departure time of packet 'i'.

17. The device as claimed in claim 15, further comprising computing a bandwidth deviation for a packet in the packet order queue.

18. The device as claimed in claim 17, wherein the bandwidth deviation for a packet 'i' in the packet order queue is defined as $BwDev(i)=DT(i)-(AT(i)+\text{MinD}+BT(i))$, where $BwDev(i)$ is the bandwidth deviation of the packet 'i' and $BT(i)$ is the bandwidth induced delay.

19. A non-transitory computer readable storage medium having stored thereon computer executable instructions for performing a method of optimizing the performance of an application in a network, the method comprising:
determining an arrival time of a packet, wherein the packet is transmitted from a client device
establishing a packet ordering queue, wherein the position of the packet in the packet ordering queue corresponds to a time determinate order of reception of the packet;
computing a maximum delay value, wherein the maximum possible delay value is defined by $WT(i) = AT(i) + \text{MaxD} - DT(i-1)$, when $DT(i-1) > AT(i) + \text{MinD}$ $= \text{MaxD} - \text{MinD}$, when $DT(i-1) <= AT(i) + \text{MinD}$ where WT(i) is the maximum possible delay value, MaxD is the maximum delay time associated with the packet 'i', MinD is the minimum delay time associated with the packet 'i', DT (i−1) is a departure time of packet immediately preceding the packet i in the packet ordering queue, and AT(i) is the arrival time of the packet i at the network emulator node;

applying the computed maximum delay time;

applying a minimum delay time;

determining a bandwidth delay time, wherein the bandwidth delay time is determined by the size of the packet over the effective bandwidth of the network; and computing a packet departure time for the packet, wherein the packet departure time incorporates a delay interval determined on the basis of the packet arrival time, the maximum delay time, the minimum delay time, and the bandwidth delay time.

* * * * *